US010284640B2

(12) United States Patent
Jalwadi et al.

(10) Patent No.: US 10,284,640 B2
(45) Date of Patent: May 7, 2019

(54) SYSTEMS AND METHODS TO ACHIEVE INTERWORKING BETWEEN RCS AND NON-RCS NETWORKS

(71) Applicant: Tech Mahindra Limited, Pune (IN)

(72) Inventors: Milind Shridhar Jalwadi, Pune (IN); Sankarnarayanan Nagasubramaniam, Pune (IN)

(73) Assignee: TECH MAHINDRA LTD., Pune (IN)

( * ) Notice: Subject to any disclaimer, the term of this patent is extended or adjusted under 35 U.S.C. 154(b) by 275 days.

(21) Appl. No.: 15/246,105

(22) Filed: Aug. 24, 2016

(65) Prior Publication Data

US 2017/0063977 A1    Mar. 2, 2017

(30) Foreign Application Priority Data

Aug. 25, 2015    (IN) .......................... 3239/MUM/2015

(51) Int. Cl.
*H04L 29/08* (2006.01)
*H04L 29/06* (2006.01)
*H04L 12/24* (2006.01)

(52) U.S. Cl.
CPC ........ *H04L 67/104* (2013.01); *H04L 41/0213* (2013.01); *H04L 65/104* (2013.01); *H04L 65/1006* (2013.01); *H04L 65/1016* (2013.01); *H04L 65/1063* (2013.01); *H04L 65/1069* (2013.01); *H04L 65/403* (2013.01)

(58) Field of Classification Search
CPC ....... H04W 80/04; H04W 8/26; H04W 84/12; H04W 84/18; H04W 88/06; H04W 74/08; H04W 88/08; H04L 2012/5608
USPC ............ 370/401, 402, 310.2, 328, 338, 349
See application file for complete search history.

(56) References Cited

U.S. PATENT DOCUMENTS

| 2007/0255852 A1* | 11/2007 | McBride | ............... H04W 12/06 709/246 |
| 2011/0154416 A1* | 6/2011 | Kim | ................... H04N 7/17318 725/98 |
| 2013/0231083 A1* | 9/2013 | Keren | ................ H04L 12/1403 455/408 |

* cited by examiner

*Primary Examiner* — Brenda H Pham
(74) *Attorney, Agent, or Firm* — Sheppard, Mullin, Richter & Hampton LLP; Daniel N. Yannuzzi

(57) ABSTRACT

Disclosed are the methods and systems for enabling interworking between RCS and non RCS networks in a completely seamless and transparent manner in which there will be no need to update or develop a new RCS end device or a client software and still achieving the interworking with non RCS networks only by network specific deployments and configurations. Proposed systems and methods shall extend all the RCS services to the non RCS contacts of the RCS users (subject to subscription to particular non RCS network that offers RCS kind of services) retaining the end client devices or end client applications used both by the RCS user and non RCS user.

13 Claims, 5 Drawing Sheets

Interworking Gateway (IWG)

SYSTEMS AND METHODS TO ACHIEVE INTERWORKING BETWEEN RCS AND NON-RCS NETWORKS

CROSS-REFERENCE TO RELATED APPLICATION

This application claims priority to foreign Indian patent application No. 3239/MUM/2015, filed on Aug. 25, 2015, the disclosure of which is incorporated by reference in its entirety.

FIELD OF THE INVENTION

This disclosure relates to interworking of Rich Communication Service (RCS) in the telecommunication network with other non RCS networks that offer similar kind of services as offered by the RCS enabled network and more particularly defines system and method to extend all the compatible RCS services vis-a-vis non RCS services, available with a subscriber to its buddies or contacts residing in any of the social networks, or being served by any VoIP service provider or served through any proprietary implementation by enterprises, in a transparent and seamless manner, while retaining the operator branded RCS client with its unique set of user experience.

DEFINITIONS OF TERMS USED IN THE SPECIFICATION

The expression 'RCS' used hereinafter in the specification refers to the Rich Communication Services;

The expression 'Non-RCS' used hereinafter in the specification refers to the services resembling to that of RCS being offered by the non-RCS network;

The expression 'OTT' used hereinafter in the specification refers to the Over The Top technology;

The expression 'GSM' used hereinafter in the specification refers to the Global System for Mobile;

The expression '3GPP' used hereinafter in the specification refers to the 3$^{rd}$ Generation Partnership Project;

The expression 'VoIP' used hereinafter in the specification refers to the Voice Over Internet Protocol;

The expression 'IMS' used hereinafter in the specification refers to the IP Multimedia sub-system;

The expression 'AS' used hereinafter in the specification refers to the Application Server component in the IP Multimedia sub-system;

The expression 'iFC' used hereinafter in the specification refers to the initial Filter Criteria;

The expression 'GSMA' used hereinafter in the specification refers to the GSM Association;

The expression 'SMS' used hereinafter in the specification refers to the Short Messaging Service;

The expression 'OMA' used hereinafter in the specification refers to the Open Mobile Alliance;

The expression 'CAB' used hereinafter in the specification refers to the Converged Address Book;

The expression 'MSISDN' used hereinafter in the specification refers to the Mobile Station International Subscriber Directory Number;

The expression 'MSC' used hereinafter in the specification refers to the Mobile Switching Centre;

The expression 'REST' used hereinafter in the specification refers to the Representational State Transfer;

The expression 'XMPP' used hereinafter in the specification refers to the Extensible Messaging and Presence Protocol;

The expression 'SIP' used hereinafter in the specification refers to the Session Initiation Protocol;

The expression 'SIMPLE' used hereinafter in the specification refers to the session initiation protocol for instant messaging and presence leveraging extensions;

The expression 'SMSC' used hereinafter in the specification refers to the short message service center;

The expression 'OSS' used hereinafter in the specification refers to the Operations Support Systems;

The expression 'BSS' used hereinafter in the specification refers to the Business Support Systems;

The expression 'SMPP' used hereinafter in the specification refers to the Short Message Peer-to-Peer;

The expression 'EMI' used hereinafter in the specification refers to the External Machine Interface;

The expression 'IWG' used hereinafter in the specification refers to the Interworking Gateway;

The expression 'PCC' used hereinafter in the specification refers to the Personal Contact Card;

The expression 'CAB' used hereinafter in the specification refers to the Converged Address Book;

The expression 'RCS kind' used hereinafter in the specifications refers to the category of the RCS service that is comparable with the non RCS service;

The expression 'ISC' used hereinafter in the specifications refers to the IP Multimedia Subsystem Service Control interface.

BACKGROUND

Rich Communication Services a.k.a. RCS is the set of specifications being driven by operator community under the GSMA umbrella. A goal is to get an edge over the OTT competition that network operators seem to be losing as of now to the likes of Whatsapp, Skype etc. Even though RCS shall provide same kind of services like the OTT providers viz. peer-to-peer chat, group chat, location updates, file transfer, capability exchange, voice/video calls etc.—yet network operators have an edge as compared to their OTT providers in terms of leveraging their network infrastructure to provide quality of service, conferencing services or any other value adds that typically OTT providers may not be able to provide. Till the time RCS becomes a truly globally interoperable service like voice and SMS, the need to interwork with the OTT world will stay simply because most of the subscribers are not in the RCS world and operators having invested in RCS would like that end users use their RCS services and a network operator branded RCS client to the extent possible such that most or all of the communication needs are served by the RCS eco system.

This disclosure focuses on the aspect of extending the 'RCS kind' of experience to all the subscriber's buddies including the OTT or social contacts, buddies being served by other VoIP service providers, subscribers being served by enterprises—and thus not just restricting the RCS experience only to the RCS users—but most importantly by retaining the existing RCS clients and thereby implicitly asserting that there would be no new integration requirements between the RCS end point and the network to achieve the RCS and non RCS network (Social or otherwise) interoperability.

It should be noted here that the current RCS specifications do not state any ways or methodology of interworking with non RCS networks. However as stated before, this is an important business requirement given that it would still take few years for all the operators to implement RCS and the overall global GSM subscribers to see the day when RCS would truly be a globally interoperable service like that of Voice and SMS. Until that happens, an efficient and optimal architecture has to be in place which could easily fit in the standards based architecture and which protects the existing operator investments in IMS and RCS elements but still is capable of extending the reach of RCS subscribers to other non RCS subscribers.

In context of above, some limitations of the existing RCS specifications are summarized below:

1. Inability to interwork with non RCS networks that would include other packet switched VoIP networks and social networks that provide service mix similar to what RCS network provides to its users.

2. Limitations imposed by the virtue of endorsement of specifications from other standard bodies that limits the possibility of interworking with non RCS networks.

For example, OMA CAB specifications and vCard specifications do not specify a methodical way to define service provider's parameters serving the particular contact. Because of this, the RCS systems do not have any mechanism where-in non RCS contacts could be identified and processed accordingly.

Moreover, to enable communication between RCS and non RCS networks, the most important aspect is how the addressing and routing of non RCS entity that is being served by another service provider is handled.

Until few years back when only circuit switched voice services were offered by the Telco's, a MSISDN or an E.164 identity of a contact would suffice to offer this type of service. Further, the routing of the call related data (signaling and media) based on the service provider serving the contact would be handled by the core network elements like MSCs itself.

Now with the current evolution, services on a packet switched network have to be offered and sessions need to be routed to the appropriate service provider serving the contact. In an all IP world, this routing decision based on the service provider serving the contact should not be rested in the core network elements. Also the existing specifications do not specify the information in the depth required to be captured to ensure proper interworking with the service provider that is essential for technical realization.

The present disclosure proposes unique system and method that would address all the above limitations and would enable RCS networks to interwork with non RCS networks while retaining the existing RCS investments like RCS client and RCS core network elements that are realized based on the published RCS specifications (RCS 5.2) as on the date of writing the present specifications.

Some of the aspects of the present disclosure aimed to address one or more problems of the prior art or to at least provide a useful alternative are described herein below:

An aspect of the present disclosure is to provide system and method which would enable a communication between RCS and Non-RCS users in a seamless and transparent manner.

Further aspect of the present disclosure is to provide systems and methods that purposefully operates within the ambit of existing set of RCS and RCS endorsed specifications to achieve the interworking by integrating with the existing standards based network elements and with all the end users participating in the communication session using their existing client devices which would not need any software modifications at the client side to support the new interworking scenarios.

Yet another aspect of the present disclosure is to extend all the "applicable" RCS services to the Non-RCS users in a seamless and transparent manner.

Still another aspect of the present disclosure is to extend the operator hosted services like conferencing including the ability to control the conferencing attributes to all the non-RCS users in a seamless and transparent manner.

Other aspects and advantages of the present disclosure will be more apparent from the following description when read in conjunction with the accompanying figures, which are not intended to limit the scope of the present disclosure.

SUMMARY

Accordingly, the present disclosure provides a system and methods for enabling RCS subscribers to connect with non-RCS subscribers (Social or otherwise) in a seamless manner, without any modifications or upgrades to the existing RCS clients.

As shown in the FIG. 1a, the system comprises of Interworking Gateway (IWG) that typically represents an Application Server in the IMS network. The IWG integrates with IMS network using standards based mechanisms as mandated by the 3GPP specifications.

The IWG consists of a Subscription Module that is used by the RCS subscribers to subscribe to the service that enables seamless interworking with non-RCS networks (Social or otherwise). The Subscription Module presents to the RCS subscriber the list of non-RCS networks (Social or otherwise) that the operator can interwork with. The RCS subscriber can then select the networks (Social or otherwise) that he/she would like to subscribe to. Based on the network selections, the Subscription Module triggers the Provisioning Module for further processing.

The Provisioning Module invokes the Event Processing Engine to interwork with the destination network for authentication and first time provisioning requirements.

The Event Processing Engine is integrated with the related plug-in for the non RCS networks and executes the authentication and first time provisioning logic with the destination non-RCS network. It also integrates with the RCS network and updates/creates entities in the related RCS network element utilizing the appropriate Protocol Connectors to Network Elements.

Once the subscription and first time provisioning activities are competed, the RCS user can start using the IWG features where-in the user can seamlessly connect with non-RCS user in the subscribed network and participate in the real time sessions in peer-to-peer or multiparty modes. This is essentially controlled by the Event Processing Engine that interfaces with the Peer-to-Peer Interworking Module, Multi Party Interworking Module, Protocol Connectors to Network Elements and the related plug-in for the non RCS networks.

BRIEF DESCRIPTION OF DRAWINGS

A system and method will be described with the help of accompanying drawings, in which.

DETAIL DESCRIPTION

Figure 1A:
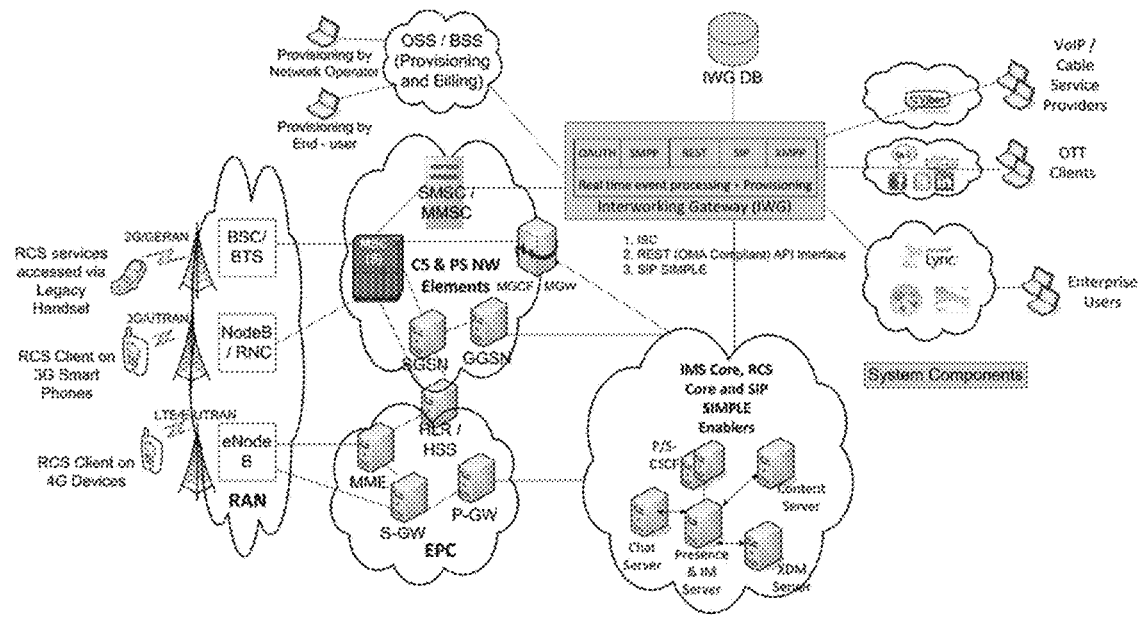
FIG. 1a represents a block Diagram of the RCS to non-RCS interworking eco system showing the Interworking Gateway.

A preferred embodiment will now be described in detail with reference to the accompanying drawings. The preferred embodiment does not limit the scope and ambit of the invention. The description provided is purely by way of example and illustration.

The present disclosure relates to an improved and efficient methodology of communication between RCS and Non-RCS users. The invention facilitates seamless and quick communication between users who are owned and served by different or distinct communication providers. To achieve this objective, the invention/disclosure does not envisage any software modifications in RCS client to support the interworking scenarios between RCS and Non-RCS users. It allows extending the RCS service experience to non-RCS users.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

A proposed system and method which is collectively referred to as "Interworking Gateway (IWG)" in the rest of the disclosure, may, in some embodiments:

A. Enable an end RCS user to subscribe to the non RCS networks (social or otherwise) through a specific subscription mechanism that is detailed in the later sections;

B. Mandate a specific set of provisioning steps to provision network and IT elements in the operator deployment so as to interwork with non RCS networks (Social or otherwise) in a transparent manner;

C. Realization of additional stateful system to translate the sessions between RCS and non RCS networks (Social or otherwise), originating from either of the ends and to ensure the delivery of the same to the existing end points at both the ends;

D. Seamless extension of the conferencing service scenarios to all the participants in RCS and non RCS networks alike.

The disclosure detailed in the subsequent sections below is described in reference to the preferred embodiment of the present invention. The features or characteristics described herein below are merely for illustrative purpose and shall not limit the scope of the present invention.

As per one of the embodiment of the present invention the features of non-RCS network (Social or otherwise) can be:

1. Similar set of services that are offered by RCS networks (Social or otherwise) in comparison with the RCS set of services. These include exchange of social presence information, peer-to-peer chat, group chat, file transfer, location exchange, voice call and video call.

2. Standards based interworking which include OAUTH 2.0 framework for authentication and authorization or which offer a federated interworking set-up where domains authenticate each other—as in case of XMPP.

3. REST based mechanisms, XMPP or SIP protocols to deliver the sessions related to RCS service mix.

In cases where the non RCS network has a custom or a proprietary mechanism for authentication/authorization and sessions delivery for the similar set of service as that of the RCS, the proposed system because of the extensible architecture shall be able to implement the relevant plug-in and interwork with such non RCS networks.

The system and method of the present invention will be described herein below with reference to FIG. 1 to FIG. 7.

FIG. 1a depicts a high level view of a typical Interworking Gateway deployment in an operator premise to achieve RCS and non RCS network interoperability.

The role of IWG is to achieve the interworking between RCS and non RCS networks by encompassing the provisioning and real time session handling scenarios. Salient points in regards to the functionality are stated below:

1. The pre-requisites on the network operator's end are:
   A. IMS Core and RCS entities
   B. SIP SIMPLE elements for presence scenarios
   C. Chat application server implementation based on RCS
   D. Standards based interface for SMSC integration (Example SMPP, EMI)
   E. A subscription and provisioning mechanism being triggered by the OSS 2. All the RCS features with the corresponding peer entities being in a non RCS network (Social or otherwise) could be accessed by 3G and 4G devices/network that support IP connectivity. Few RCS features like text based peer-to-peer chat, group chat and voice calls with corresponding peer entities being in a non RCS network (Social or otherwise) would also be supported by the IWG on the legacy handsets/networks. This can be done by utilizing the SMSC for text chats and media gateways for converting the voice calls between circuit switched and IP networks.

3. The IWG shall integrate with operator's OSS and BSS systems through a standards or proprietary interfaces. For billing scenarios, 3GPP proposed Ro and Rf interfaces would be used. The subscription and provisioning trigger shall be sent to the IWG in line with the existing CRM and OSS implementations by the network operator.

4. The interworking gateway integrates with IMS/RCS core via ISC or REST based interfaces. The IWG also utilizes the SIP SIMPLE interfaces for supporting presence based use cases. The IWG shall re-use the chat application servers that support peer-to-peer and group chats as elaborated in the RCS specifications. The exhaustive list of interfaces supported by IWG is specified in the table below.

5. Most of the social networks support OAUTH 2.0 based authentication which the IWG shall utilize. In specific cases where standards based mechanisms like OAUTH 2.0, XMPP and SIP are not supported by the peer network, IWG architecture is extensible so that proprietary interfaces would be added as required to achieve the required and achievable interworking.

Figure 1B:
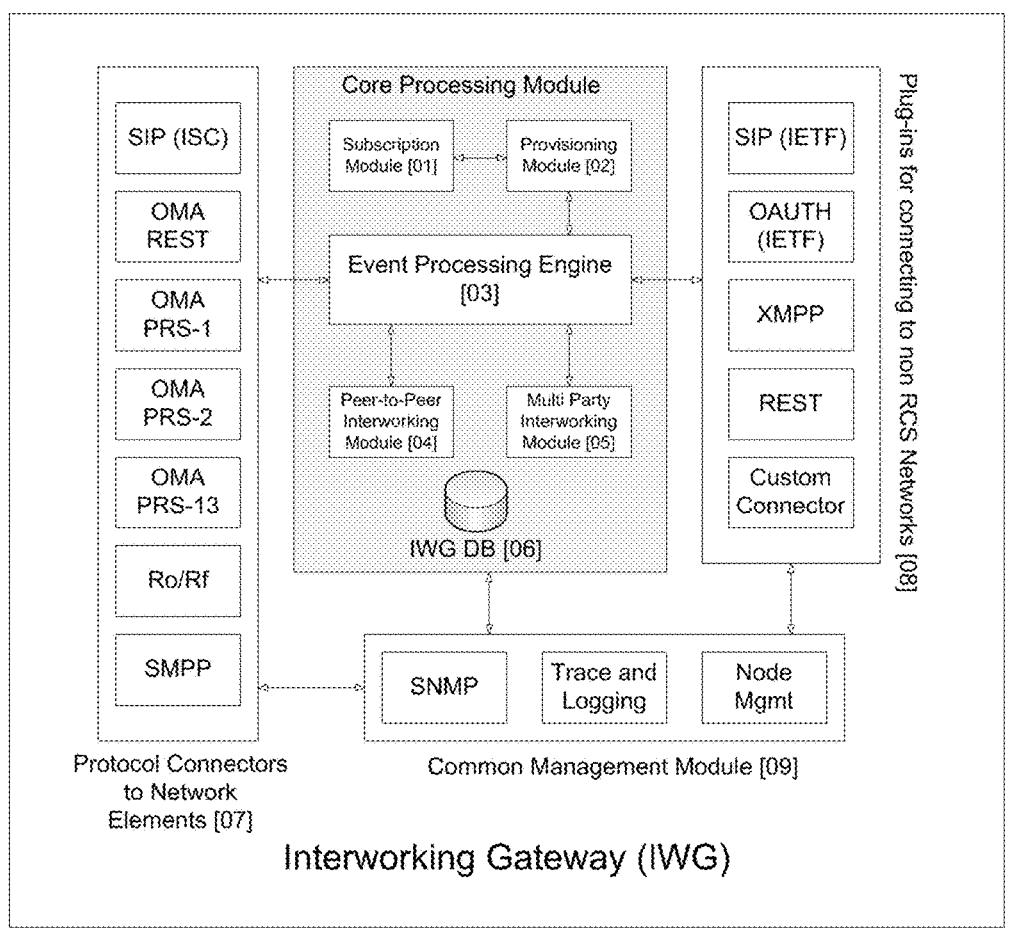
FIG. 1b represents a High Level Architecture design of the Interworking Gateway (IWG), in accordance with the present invention.

FIG. 1b depicts a high level Architecture design of the Interworking Gateway implementation. The important functional elements in the IWG architecture are mentioned in brief below:

1. Protocol Connectors to Network elements [07]—This piece of IWG implementation provides an extensible framework for integration with various network elements that are required for realizing the interworking between RCS and non RCS networks.
2. Plug-ins for connecting to non RCS networks [08]— The Interworking Gateway is designed to interwork with various non RCS networks that provide RCS kind of services. To support all the standard and non-standard integration for such networks, a plug-in based extensible framework is implemented so that customized plug-ins could be added in the IWG framework to interwork with the particular non RCS network—social or otherwise.
3. Common Management Features [09]—All the common management features like SNMP support, node management functions, tracing etc. are made available as a common service for other components to use.
4. Core Processing Logic—The modules in this section act on the events originating from external interfaces and not from IWG, performs the necessary interworking and then routes the sessions or transaction to the destination network as required. The key sub modules of core processing logic are—
    a. Subscription module [01]—This module is typically triggered by the OSS, when the end-user or a subscriber initiates subscription to specific set of non RCS networks—social or otherwise.
    b. Provisioning module [02]—This module shall provision and possibly create new data elements in the appropriate network elements. Further provisioning module comprises systems and methods to provision and configure the RCS and non RCS networks after the subscription to facilitate the usage of the services post subscription;
    c. IWG DB [06]—This database shall store non RCS specific authentication information that is required to get authenticated by the non RCS network.
    d. Event processing engine [03]—Event processing engine shall process the transactions that originate from RCS and non RCS networks. Depending on the nature of session, i.e. peer-to-peer or multi-party session, the related processing logic shall be applied.

This enclosure shall elaborate further all the details of the Interworking Gateway in the subsequent sections.

Exhaustive list of Integration Interfaces supported by IWG:

| Sr. No. | Interface Specifications | Details |
|---|---|---|
| 1 | IMS ISC interface as per 3GPP specifications | The Interworking Gateway registers to the IMS network though this interface. This interface is used to send and receive SIP messages to/from IMS/RCS network |
| 2 | OMA PRS-1 SIP SIMPLE interface | This interface is used by Interworking Gateway to update the presence information/update originated from non RCS network (Social or otherwise) |
| 3 | OMA PRS-2 SIP SIMPLE interface | This interface is used by Interworking Gateway to subscribe to the presence information of all the end users who have opted for the IWG service. IWG shall get the presence updates from this interface and accordingly send this update to non RCS networks (Social or otherwise) |
| 4 | OMA PRS-13 SIP SIMPLE interface | This interface is used by Interworking Gateway during the provisioning phase. The user's buddies from non RCS networks (Social or otherwise) are added as "presentities" in the SIP SIMPLE compliant entities |
| 5 | OMA RESTful bindings for Parlay X Web Services - Call Notification | This interface is used by Interworking Gateway for networks that support RESTful interfaces for handling media sessions |
| 6 | OMA RESTful Network API for Chat | This interface is used by Interworking Gateway for networks that support RESTful interfaces for chat scenarios |
| 7 | OMA RESTful Network API for Notification Channel | This interface is used by Interworking Gateway for networks that support RESTful interfaces for media session and chat scenarios |
| 8 | IETF SIP specifications | This interface is used by Interworking Gateway to interwork with VoIP service providers or with any enterprise VoIP products |
| 9 | IETF OAUTH 2.0 specifications | This interface is used by Interworking Gateway for 3rd party application authentication by the social networks or OTT providers. Examples include the likes of facebook, linked-in, twitter etc. |
| 10 | XMPP interface as per IETF and XMPP Standards Foundation | This interface is used by Interworking Gateway as signaling protocol with the OTT providers that support it. Examples include the likes of Gtalk, facebook etc. |
| 11 | Ro/Rf interface as per 3 GPP specifications | This interface is used by Interworking Gateway for online or offline billing requirements |
| 12 | SNMP interface as per IETF specifications | This interface is used by Interworking Gateway for monitoring of it'self by the management entity |
| 13 | SMPP interface as per SMS forum | This interface is used by Interworking Gateway to extend the peer-to-peer text chat and group chat scenarios to the end users on legacy handsets and network |
| 14 | Proprietary | A plug-in based architecture is supported to interwork with non RCS network/service providers which do not support any standards based mechanism for interworking. An extendable architecture shall allow deployment of such proprietary plug-ins in a seamless manner |

Gist of the system and methodology proposed in the current disclosure is summarized below:
1. A IWG provisioning system shall use the "OMA— Converged Address Book XDM Specification" to store the non RCS buddies (Social or otherwise) in the OMA CAB (Converged Address Book) system.
2. A IWG provisioning system shall use the "OMA PRS-13 SIP SIMPLE interface" to add the user's buddies from non RCS networks (Social or otherwise) as "presentities" in the SIP SIMPLE compliant entities.
3. A IWG provisioning system shall use the "OMA PRS-2 SIP SIMPLE interface" to subscribe to the presence information of all the end users who have opted for the IWG service.
4. A IWG session processing system that shall use "OMA PRS-1 SIP SIMPLE interface" to update the presence information/update originated from non RCS network (Social or otherwise)

5. A IWG provisioning system that shall use the operator specific HSS provisioning interface to add the relevant initial filter criteria's (iFC) for IWG scenarios
6. A IWG session processing system that shall use the "IMS ISC interface as per 3GPP specifications" to receive and to send the signaling messages specific to IWG scenarios.

The above proposed system and methodology is elaborated with a logical flow in the subsequent sections.

OMA CAB usage to store non RCS contacts:

An aspect of the present disclosure is to enable RCS users to interoperate with non RCS users/buddies that are served by other social networks, VoIP service providers or those being served by specific enterprises. To achieve this objective in a transparent manner, the users/buddies in the non RCS networks need to be "visible" to the RCS users on their existing RCS clients. Additionally the RCS users should also be able to use the RCS services like chats, media session etc. with their non RCS contact—as long as the service provider of the non RCS contact supports similar services. Since changes are not proposed in the RCS client specifications and also not placing any additional integration requirements on RCS client with the network, the present invention states a methodology and a system that would import contacts from non RCS networks in to the RCS endorsed OMA CAB system and make the interworking possible.

It should also be noted that in the current "OMA—Converged Address Book XDM Specifications" there is no scope for specifying set of service providers serving the contact's particular identity—specifically any address entity that is not a SIP URI or any E.164 telephone number. There is a need to extend the standards to enable specification of contact entities in social networks or those being served by any OTT provider.

To this effect, the present invention uses the SIP URI scheme to store the actual OTT identity of the non RCS contact.

Sample examples of a non-RCS contact identity that would be stored in the OMA CAB system are given below:
sip:joe.watson@facebook.com
sip:harry.t@linkedin.com
sip:j ames.cone@google.com
sip:hetalr@twitter.com During the provisioning phase, the proposed new system—namely the IWG provisioning system shall interwork with non RCS network and import the user's contact and store the same in the OMA CAB system.

The SIP URI shall have the following components:
1. Contact identity specific to OTT provider
2. OTT provider's domain name Using SIP URI to store OTT contacts will enable the RCS client to originate the messages/sessions with the OTT contact in the same way as other RCS contacts. It would be transparent from the RCS client's perspective in terms of session origination and session reception via-a-via RCS and the non RCS contacts. The IMS & RCS core would also be able to process the messages destined to OTT domain in a transparent manner and would be able to route such SIP messages to the Interworking Gateway. IWG shall then be able to parse the SIP URI and decipher the OTT user ID and the OTT service provider name from the SIP URI for further appropriate processing.

In line with the objective of retaining the existing RCS clients to transparently avail RCS like features with other OTT and non RCS providers, this invention proposes two particular ways of OMA CAB usage to store the OTT contacts:

A. Converged address book: In this approach, during the provisioning phase—the contacts from OTT are merged within the existing address book, by having additional "pcc:uri-entry" (Ref: Converged Address Book XDM Specification by OMA) for the existing contact that stores the OTT identity of that contact. This shall be realized by the proposed new IWG provisioning system.

B. OTT contacts stored as groups for specific OTT providers: In this approach distinct groups for each OTT provider are created by using the field "group-details" (Ref: Converged Address Book XDM Specification by OMA) and contacts from that specific OTT are stored as members of that particular group. Thus a user shall have those many number of groups as the OTT providers subscribed to and all the buddies from that OTT provider shall be visible as individual group members. This shall be realized by the proposed new IWG provisioning system.

Sample PCC Address book XMLs for both the above approaches is specified below as an example (Modifications are highlighted for convenience).

Sample Address book XML document with converged address book approach:

Sample XML document for the approach where-in all the identities of non RCS buddies in various social/OTT networks are stored as a single CAB entry for that specific non RCS buddy is specified below. Please refer to the underlined portion for the changes specific to the current disclosure.

```
<address-book xmlns="urn:oma:xml:cab:address-book"
xmlns:pcc="urn:oma:xml:cab:pcc"
xmlns:xsi="http://www.w3.org/2001/XMLSchema-instance">
<contact id="aliudhjhd">
<contact-status>
<contact-type>
<type>CAB</type>
<contact-type-source>other<contact-type-source/>
</contact-type>
<entry-status>
<updated ack='true'>contact subscription</updated>
</entry-status>
<contact-subscription-status>active</contact-subscription-status/>
<contact-source>CAB</contact-source>
</contact-status>
<pcc:person-details>
<pcc:name-entry xml:lang="en" name-type="LegalName">
<pcc:title>Mr.</pcc:title>
<pcc:given>John</pcc:given>
<pcc:family>Smith</pcc:family>
<pcc:display-name>Jack</pcc:display-name>
</pcc:name-entry>
<pcc:address>
<pcc:address-entry addr-type="Home" xml:lang="en">
<pcc:location>
<pcc:location-label>Alabama, USA</pcc:location-label>
</pcc:location>
<pcc:addr-string>XYZ Corporation, 111 Park Avenue,
Huntsville AL 11111, USA</pcc:addr-string>
</pcc:address-entry>
</pcc:address>
<pcc:comm-addr xml:lang="en'">
<pcc:comm-addr xml:lang="en">
<pcc:uri-entry pref="1" addr-uri-type="Home SIP-URI" XUI="CAB">
<pcc:addr-uri>sip:john.smith@example.com</pcc:addr-uri>
<pcc:label>John Smith IP Phone</pcc:label>
</pcc:uri-entry>
<pcc:uri-entry pref="2" addr-uri-type="Other SIP-URI" XUI="CAB">
<pcc:addr-uri> sip:john.smith@facebook.com </pcc:addr-uri>
<pcc:label>facebook</pcc:label>
</pcc:uri-entry>
<pcc:uri-entry pref="3" addr-uri-type="Other SIP-URI" XUI="CAB">
<pcc:addr-uri> sip:john.smith@google.com </pcc:addr-uri>
```

```
<pcc:label>google</pcc:label>
</pcc:uri-entry>
<pcc:tel pref="1" tel-type="Home Mobile">
<pcc:tel-nb>
<pcc:tel-str>1-800-555-1213</pcc:tel-str>
</pcc:tel-nb>
<pcc:label>Personal Phone</pcc:label>
</pcc:tel>
<pcc:tel pref="2" tel-type="Pager">
<pcc:tel-nb>
<pcc:tel-uri>tel:+1-800-555-1214</pcc:tel-uri>
</pcc:tel-nb>
<pcc:label>Personal Pager</pcc:label>
</pcc:tel>
</pcc:comm-addr>
<pcc:birth xml:lang="en">
<pcc:birth-date>
<pcc:date>1957-07-09T06:01:00</pcc:date> </pcc:birth-date>
<pcc:place>Saint Joesph Hospital Little Rock, Arkansas</pcc:place>
</pcc:birth>
<pcc:web-resources xml:lang="en">
<pcc:web-entry>
<pcc:url>http://example.com/index.html</pcc:url>
<pcc:label>My Home Page</pcc:label>
</pcc:web-entry>
</pcc:web-resources>
<pcc:interests-list xml:lang="en">
<pcc:interest-entry i-level="High">Live TV </pcc:interest-entry>
<pcc:interest-entry i-level="Low">Video Games</pcc:interest-entry>
</pcc:interests-list>
<pcc:organization-list>
<pcc:organization-entry>
<pcc:display-name> AB Inc.</pcc:display-name>
<pcc:entity> Any Biz Inc.</pcc:entity>
<pcc:unit>SE Region Sales</pcc:unit>
<pcc:role>Sales Manager</pcc:role>
</pcc:organization-entry>
</pcc:organization-list>
<pcc:note xml:lang="en">Another boring Monday :-(</pcc:note>
</pcc:person-details>
</pcc:contact>
Sample Address book XML document with OTT contacts in
distinct groups
Sample XML document for the approach where-in all the non RCS
buddies specific to a particular social/OTT networks are stored as in
a particular group is specified below. Please refer to the highlighted
portion for the changes specific to the current disclosure.
<address-book xmlns="urn:oma:xml:cab:address-book"
xmlns:pcc="urn:oma:xml:cab:pcc"
xmlns:xsi="http://www.w3.org/2001/XMLSchema-instance">
<group-details index="sdkjanhd">
<group-name>
<display-name>facebook buddies</display-name>
<entity>Buddies from facebook</entity>
</group-name>
<group-member-list>
<group-member index="sakhd">
<member-details-url>application/vnd.oma.cab-pcc+xml
</member-details-url>
<pcc:person-details>
<pcc:name-entry xml:lang="en" name-type="LegalName">
<pcc:title>Mr.</pcc:title>
<pcc:given>John</pcc:given>
<pcc:family>Smith</pcc:family>
<pcc:display-name>Jack</pcc:display-name>
</pcc:name-entry>
<pcc:uri-entry pref="1" addr-uri-type="Other SIP-URI" XUI="CAB">
<pcc:addr-uri> sip:john.smith@facebook.com </pcc:addr-uri>
</pcc:uri-entry>
</pcc:person-details>
<pcc:person-details>
<pcc:name-entry xml:lang="en" name-type="LegalName">
<pcc:title>Mr.</pcc:title>
<pcc:given>Alex</pcc:given>
<pcc:family>GoldSmith</pcc:family>
<pcc:display-name>Alex</pcc:display-name>
</pcc:name-entry>
<pcc:uri-entry pref="1" addr-uri-type="Other SIP-URI" XUI="CAB">
<pcc:addr-uri> sip:alex.goldsmith@facebook.com </pcc:addr-uri>
</pcc:uri-entry>
</pcc:person-details>
</group-member>
</group-member-list>
</group-details>
<group-details index="dhdydjdd">
<group-name>
<display-name>gtalk buddies</display-name>
<entity>Buddies from gtalk</entity>
</group-name>
<group-member-list>
<group-member index="sakhd">
<member-details-url>application/vnd.oma.cab-pcc+xml
</member-details-url>
<pcc:person-details>
<pcc:name-entry xml:lang="en" name-type="LegalName">
<pcc:title>Mr.</pcc:title>
<pcc:given>Merry</pcc:given>
<pcc:family>louis</pcc:family>
<pcc:display-name>Merry</pcc:display-name>
</pcc:name-entry>
<pcc:uri-entry pref="1" addr-uri-type="Other SIP-URI" XUI="CAB">
<pcc:addr-uri> sip:merry.lous@google.com </pcc:addr-uri>
</pcc:uri-entry>
</pcc:person-details>
<pcc:person-details>
<pcc:name-entry xml:lang="en" name-type="LegalName">
<pcc:title>Mr.</pcc:title>
<pcc:given>Sam</pcc:given>
<pcc:family>pitroda</pcc:family>
<pcc:display-name>Sam</pcc:display-name>
</pcc:name-entry>
<pcc:uri-entry pref="1" addr-uri-type="Other SIP-URI" XUI="CAB">
<pcc:addr-uri> sip:sam.pitroda@google.com </pcc:addr-uri>
</pcc:uri-entry>
</pcc:person-details>
</group-member>
</group-member-list>
</group-details>
```

Network configurations essential for IWG:

The present disclosure discloses a specific method of network configuration in relation to the proposed new system IWG—to enable session routing between RCS end user in the operator's network and a non RCS user in social or the OTT network through the IWG node that shall perform the translation required for the specific session in usage.

The present disclosure proposes following methodology:

1. The proposed new IWG system shall be deployed in the IMS network as a "Application Server" and shall use the ISC reference point for integration with the IMS core.
2. For all the users who have subscribed to IWG service, the current disclosure proposes addition of a new initial filter criteria (iFC) to be added in the service profile of the end user's IMS subscription to enable session routing through the proposed new IWG system for IWG specific scenarios.

The iFC defined for IWG service shall have following criteria:

1. 'ConditionTypeCNF' attribute value of the "Trigger Point" class could be TRUE or FALSE indicating that the "Service Point Trigger" could be expressed in the Conjunctive Normal Form (CNF) or in the Disjunctive Normal Form (DNF).
2. The attributes 'Request-URI', 'SIP Method' and 'SIP Header' of the "Service Point Trigger" class should be populated with the data relevant to IWG scenarios that the network operator would be offering to the subscribers.
3. 'ServerName' attribute of "Application Server" class should state the SIP URL of IWG Application Server.

4. 'DefaultHandling' attribute of "Application Server" class should state the value as 'SESSION_TERMINATED' as a default handling way in case the IWG Application Server is not reachable.

Sample CNF expression for a IWG scenario is given below:
(Method="INVITE" OR Method="MESSAGE" OR Method="SUBSCRIBE") AND ((Header="to" Content="facebook") OR (Header="to" Content="linkedin") OR (Header="to" Content="google") OR (Header="to" Content="twitter"))
The above iFC would ensure that IMS core routes all the sessions destined to facebook, linkedin, google and twitter by the subscribed end user to the IWG Application Server.

Therefore, the present disclosure proposes the following unique methods and systems that form a part of the invention:
1. Usage of the OMA CAB to store the non RCS contacts (Social or otherwise) of the RCS user.
2. Using the SIP URI scheme that is part of the contact details in the PCC schema as defined by OMA—to store the OTT buddy identity and the OTT provider.
3. Adding the non RCS (OTT buddies of a RCS user) CAB entries as "presentities" in the SIP SIMPLE architecture endorsed by the RCS specifications.
4. Two specific methods of storing the non RCS buddies in the OMA CAB—namely the converged address book approach and OTT contacts being stored as a separate group for every OTT/social network.
5. Subscription to the presence information of all the end users who have opted for the IWG service.
6. Realization of a new IWG provisioning system that shall use the methods stated in points 1 & 2 above.
7. Realization of a new IWG provisioning system that shall implement the functionalities stated in points 3, 4 and 5 above.
8. Process the SIP sessions, messages and notifications originating from RCS users, IMS core & RCS enablers—translate the same and send the translated message to the relevant social or OTT network.
9. Process the messages and notifications from social/OTT networks, translate the same to SIP message and send the same to IMS core network.
10. Realization of a new IWG session processing system that shall implement the functionalities stated in points 8 and 9 above.
11. Realization of a new IWG conference session processing system that shall extend the processing logic as specified in points 8, 9 & 10 above, applicable to conferencing scenarios.
12. Deployment of the IWG provisioning system and the IWG session processing system as a "application server" and integrating with the IMS core through the standards based ISC interface.
13. Addition of an initial filer criteria (iFC) for RCS users who have subscribed to the IWG service—to include the IWG session processing system/node to be in the path for the scenarios related to IWG.

The present disclosure herein explains or elaborates some specific IWG use cases however; these examples are only for illustrative purpose for providing better understanding of the present disclosure and shall limit the scope of the present invention. The person skilled in the art would appreciate that the present disclosure has wider applicability and can be used in various business scenarios.

IWG Use Case Scenarios:
1. Subscription to the IWG Service

The entire subscription flow that would be initiated by the RCS end user is detailed in this section.

The end-user shall subscribe to a particular OTT or social network through the subscription mechanism implemented by the IWG. The subscription mechanism shall vary according to the particular OTT provider or the Social Network provider. For most of the cases it would be OAUTH 2.0 or a similar mechanism that would typically be supported by the OTT provider or social network vendor. The present disclosure explains the subscription to a social network that supports OAUTH 2.0 mechanisms as an example to elaborate on the methodology used. However, the proposed solution is extensible to interwork with any non OAUTH 2.0 mechanisms by implementing the relevant plug-in in the IWG implementation.

In the OAUTH 2.0 terminology, the IWG would be a "Client", the RCS subscriber would be the "Resource Owner" and the OTT provider or the social network provider would act as "Authorization Server" and "Resource Server".

The IWG shall register with the OAUTH 2.0 compliant provider and obtain the application ID and secret from the provider. During this registration procedure, the IWG would request access to end user's contact, presence and other relevant features pertaining to the respective OTT provider or social network provider.

On subscription request by the RCS user, the IWG would request access to RCS user's contact, presence and other relevant features to the "Authorization server" pertaining to the respective OTT provider or social network provider. The authorization server would then typically redirect to the resource owner's user agent. Here the RCS user shall authorize the IWG application for the requested access and then the Authorization server shall return responses containing end user specific access token to the redirection endpoint which is a part of IWG. The end user specific access token thus returned shall be typically stored in a DB by IWG. The IWG would also subscribe to the presence notifications of the end user.

This completes the registration procedure by the IWG for a specific end user with a specific OAUTH 2.0 compliant OTT service provider or the social network provider.

IWG shall use the end user specific access token to fetch the buddies or contacts of the end user from respective OTT provider or social network vendor and add the same as "presentities" in the SIP SIMPLE infrastructure. The IWG shall also add iFC for the subscribed user in the HSS.

This completes the entire subscription and provisioning flow for an end user subscribing to a specific OTT provider or the social network provider.

Figure 2:
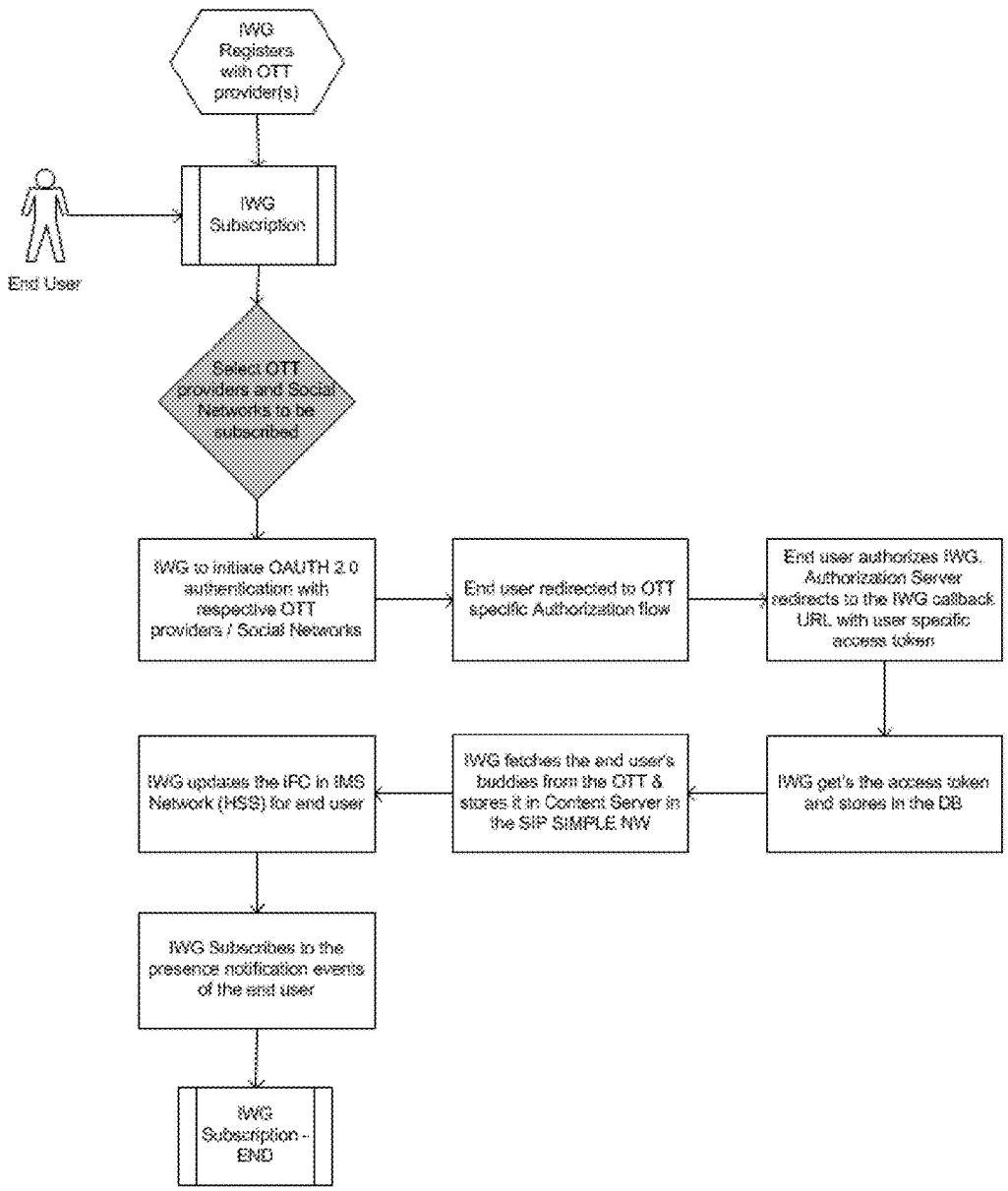
FIG. 2 represents Subscription Flow for Interworking Gateway in accordance with the present invention.

FIG. 2 depicts the detail subscription and provisioning mechanism described above. After successful subscription, the end user shall be able to see all the OTT contacts in the RCS client along with their presence updates.

Figure 3:
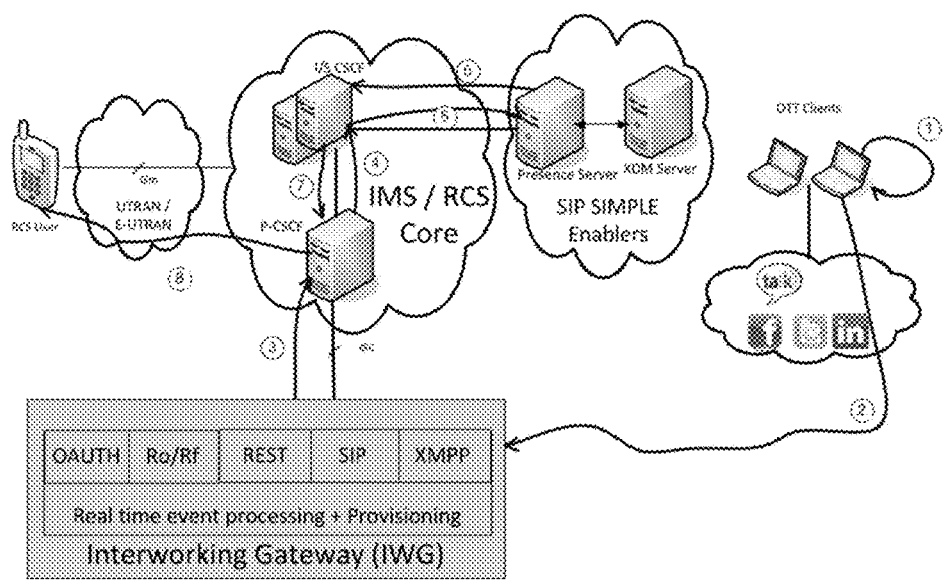
FIG. 3 represents Message Flow for Presence updates from non RCS user in accordance with the present invention.

FIG. 3 describes the detail sequence of message flow when the OTT user changes his/her presence status and the RCS end-user getting the updates of the same.
1—The OTT user updates the presence status.
2—The Interworking Gateway gets the update. The interface between IWG and the social network or OTT provider could be based on XMPP, SIP, REST based or any other proprietary mechanism as supported by the OTT provider or the social network provider.
3—The IWG shall then send a SIP PUBLISH message on behalf of the OTT buddy to the presence server located in the SIP SIMPLE network. It should be noted here that the OTT buddy was added as a "presentity" in SIP SIMPLE elements during the subscription and the provisioning phase.

4, 5—The IMS/RCS core shall route the SIP PUBLISH message till the presence server.

6—The presence server then would generate SIP NOTIFY message to all the RCS users who would have subscribed to the presence updates of this particular OTT user. It should be noted here that during the subscription and provisioning phase, the OTT buddy would have been added in the XDM server which would be part of the SIP SIMPLE architecture. The RCS client would also have subscribed to the presence information of the OTT buddy as per RCS specifications.

7, 8—The SIP NOTIFY message is delivered to the RCS user.

Figure 4:
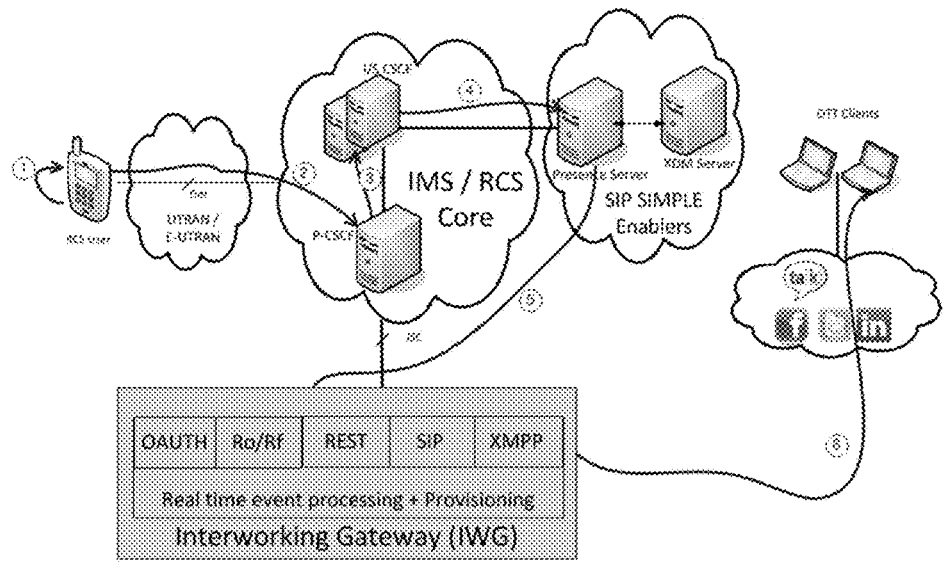
FIG. 4 represents Message Flow for Presence updates from RCS user in accordance with the present invention.

FIG. 4 depicts the detail sequence of message flows when a RCS user changes his/her presence status and the OTT buddy getting the updates of the same.

1—The RCS user updates the presence status by sending the SIP PUBLISH message 2, 3, 4—The SIP PUBLISH message is routed to the presence server in SIP SIMPLE architecture.

5—The Interworking Gateway gets the SIP NOTIFY update since it had subscribed to the presence notifications of the end user during the subscription phase.

6—The IWG shall then send the update to the relevant OTT provider or the social network provider. The interface between IWG and the social network or OTT provider could be based on XMPP, SIP, REST based or any other proprietary mechanism as supported by the OTT provider or the social network provider.

Figure 5:
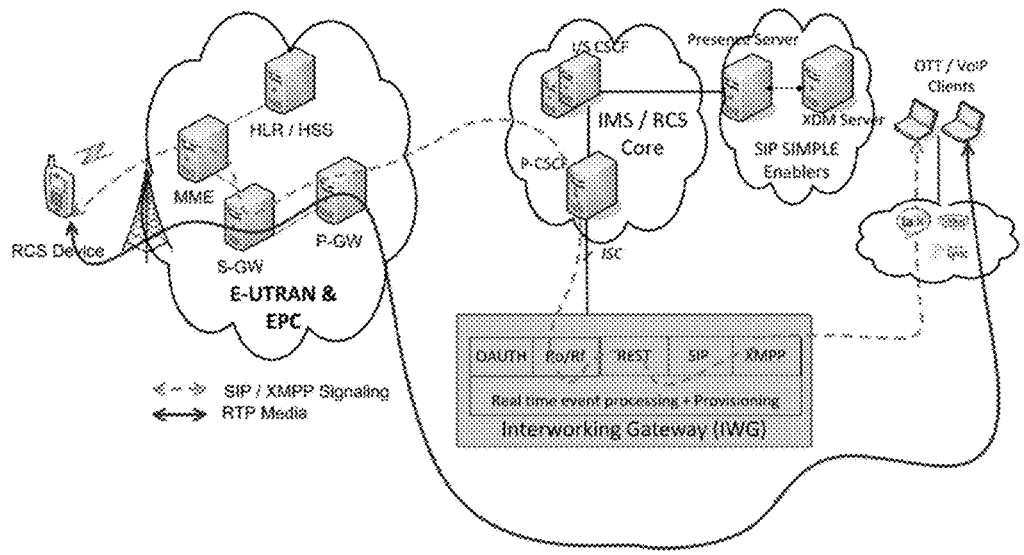
FIG. 5 represents High level flow of Media sessions between RCS and non RCS user in accordance with the present invention.

FIG. 5 details the signaling and media flows between a RCS device on 4G LTE network and non RCS network (Social or otherwise). Though the diagram depicts 4G LTE network above, it could be HSPA or a non 3GPP IP based network as mandated by the RCS specifications. Typically SIP and XMPP are used as signaling protocols while RTP is used for media. The IWG shall remain in path for all the signaling traffic while media shall flow between the end points.

Figure 6:
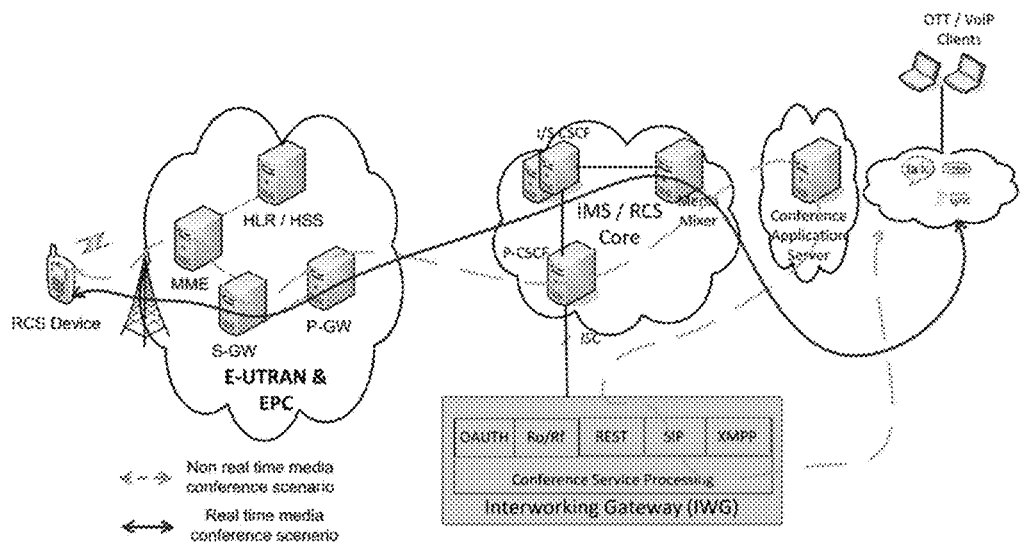
FIG. 6 represents High level flow for Conference session between RCS and non RCS user in accordance with the present invention.

FIG. 6 explains the high level flow Conference session between RCS and non RCS user. For conferencing sessions involving RCS and non RCS users, a new system for handling these sessions shall be realized, the details for which are stated below:

1. The standards based Conferencing Application Server deployed in the operator premise shall be used for signaling and media processing.
2. For non-real time media based conferencing scenarios—for example group chats, the new system to be realized as stated in the current disclosure shall act as a distinct conference participant for every non RCS user who is a participant in the conference service. The current disclosure states that from the view point of a non RCS user, the technical realization of this service would still be peer-to-peer session between RCS and non RCS user. However, the new system shall modify the session data as required and sit in the path for every transaction between RCS and non RCS users.
3. For real time media based conferencing scenarios, the new system shall participate only during the signaling phase. The new system shall modify the signaling parameters such that the media session is established directly between the non RCS user and the media mixer unit or the conference focus as may be the case depending on the actual conference solution deployed by the operator.

The technical advancements of the system envisaged by some embodiments in accordance with the present disclosure include the realization of:

1. A method that facilitates a transparent and seamless communication between RCS and Non-RCS users;
2. A method that help to extend the service and experience of RCS to the non-RCS users;
3. A method that facilitates the communication between RCS and Non-RCS users without any software modifications in RCS client to support the interworking scenarios.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps. The use of the expression "at least" or "at least one" suggests the use of one or more elements or ingredients or quantities, as the use may be in the embodiment of the invention to achieve one or more of the desired objects or results.

The numerical values mentioned for the various physical parameters, dimensions or quantities are only approximations and it is envisaged that the values higher/lower than the numerical values assigned to the parameters, dimensions or quantities fall within the scope of the invention, unless there is a statement in the specification specific to the contrary.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A system for enabling interworking between a Rich Communication Services (RCS) and a non-Rich Communication Services (RCS) network subscriber comprising:

an interworking gateway (IWG) integrated with an operator's Operations Support Systems (OSS) and Business Support Systems (BSS) systems through a standards or proprietary interfaces, further deployed in an IP Multimedia Sub system (IMS) network as an application server and comprising where the interworking gateway (IWG) comprises:

a subscription module comprising: database with entries for non-Rich Communication Services (RCS) networks available for interworking with the Rich Communication Services (RCS) network; an interface to the Business Support Systems (BSS) and Operations Support Systems (OSS) for enabling the Rich Communication Services (RCS) subscriber to select, subscribe, and connect to the non-Rich Communication Services (RCS) network from the stored list;

a provisioning module comprising: interface to subscription module, client protocol plug-in interfaces with Open Mobile Alliance (OMA) Presence SIMPLE enabler system components, distinct plug-ins integrated with non-Rich Communication Services (RCS) networks further configured to receive triggers from the subscription module to provision the Rich Communication Services (RCS) and non-Rich Communication Services (RCS) networks to enable the usage of all Rich Communication Services (RCS) services after subscription with the non-Rich Communication Services (RCS) network subscribers in a same manner without requiring any change in Rich Communication Services (RCS) server components or Rich Communication Services (RCS) client;

peer to peer interworking module and multiparty interworking module comprising the application server logic and integrated with the IP Multi-media Sub system (IMS) core through the standards based IP Multimedia Subsystem Service Control (ISC) interface; and an event processing engine integrated with the peer-to-peer interworking gateway module and the multiparty interworking module comprising: authentication and first time provisioning logic, an application server logic that integrates with an IP Multi-media Sub system (IMS) core through the standards based IP Multimedia Subsystem Service Control (ISC) interface and are programmed to translate the sessions between Rich Communication Services (RCS) and non-Rich Communication Services (RCS) networks, originating from either ends that enables the two way communication between the Rich Communication Services (RCS) and non-Rich Communication Services (RCS) users.

2. The system as claimed in claim 1, wherein, the interworking gateway further comprises:

a protocol connectors to network elements that are configured to provide an extensible framework for integration with various network elements that are required for realizing the interworking between Rich Communication Services (RCS) and non-Rich Communication Services (RCS) network;

a plug-in based extensible framework for supporting all the standard and non-standard integration with the particular non-Rich Communication Services (RCS) network;

3GPP based Ro and Rf connectors to realize the billing scenarios;

a common management module comprising logic for SNMP support and node management functions; and a database comprising storage of non-Rich Communication Services (RCS) specific authentication information that is required to get authenticated by the non-Rich Communication Services (RCS) network.

3. The System as claimed in claim 1, wherein, the provisioning module comprising of: network specific HSS provisioning interface to add the relevant initial filter criteria (iFC) to IP Multi-media Sub system (IMS) subscription of all the Rich Communication Services (RCS) subscribers to enable session routing through the interworking gateway system.

4. The System as claimed in claim 1, wherein, the provisioning module implementation comprises of:

"Open Mobile Alliance (OMA)-Converged Address Book XDM Specification" to store the non-Rich Communication Services (RCS) subscribers in the OMA Converged Address Book (CAB) system;

"Open Mobile Alliance (OMA) PRS-13 SIP SIMPLE interface" to add the subscribers as "presentities" in the SIP SIMPLE compliant entities from non-Rich Communication Services (RCS) networks; and "Open Mobile Alliance (OMA) PRS-2 SIP SIMPLE interface" to subscribe to the presence information of all the subscribers who have opted for the IWG service thereby enabling the Rich Communication Services (RCS) subscriber to interwork with the non-Rich Communication Services (RCS) subscriber.

5. The System as claimed in the claim 4, wherein, the Open Mobile Alliance (OMA) Converged Address Book (CAB) uses at least one of the converged address book approach during which the contacts of non-Rich Communication Services (RCS) Subscriber are merged within the existing Rich Communication Services (RCS) contacts by having additional identity; OR uses group specific contact store approach in which plurality of distinct groups for each non-Rich Communication Services (RCS) network provider can be created by using specific identity and contacts from that specific provider can be stored as members of that particular group.

6. The System as claimed in claim 1, wherein, the interworking gateway comprises OAUTH 2.0 or a similar mechanism for authentication that would be supported by the non-Rich Communication Services (RCS) service provider.

7. The System as claimed in claim 1, wherein, the event processing engine configured to act on events originating from IP Multi-media Sub system (IMS) core and non-Rich Communication Services (RCS) networks to perform necessary interworking and route the sessions or transaction to the destination network as required.

8. A method for enabling an interworking between RCS and non-RCS network subscribers comprising:

allowing a Rich Communication Services (RCS) subscriber to subscribe to the desired non-Rich Communication Services (RCS) network using a method of subscription module comprising:

sending request to the non-Rich Communication Services (RCS) network service provider for access to user features on receipt of subscription request from Rich Communication Services (RCS) user, obtaining authorization from the user, and persisting the authentication information;

provisioning the Rich Communication Services (RCS) and non-Rich Communication Services (RCS) networks using a provisioning method of provisioning module upon receiving the triggers from subscription module after subscription, method and comprising:

Fetching non Rich Communication Services (RCS) contacts of the Rich Communication Services (RCS) subscriber from the respective non Rich Communication Services (RCS) network, Provisioning the non-Rich Communication Services (RCS) contacts of the Rich Communication Services (RCS) users in the Rich Communication Services (RCS) network for interworking;

authenticating, first time provisioning and further processing of sessions originating from Rich Communication Services (RCS) or non-Rich Communication Services (RCS) subscriber by an event processing engine upon receiving a signal from provisioning module, peer-to-peer interworking module or multi party interworking module;

storing non-Rich Communication Services (RCS) subscriber's contact in the Open Mobile Alliance (OMA) Converged Address Book (CAB) system using Open Mobile Alliance (OMA) specifications; and translating the sessions between Rich Communication Services (RCS) and non-Rich Communication Services (RCS) networks using at least one of the peer to peer interworking module or multiparty interworking module depending on conferencing scenario and sending the translated message to the relevant Rich Communication Services (RCS) or non-Rich Communication Services (RCS) network thereby enabling the two way communication between the Rich Communication Services (RCS) and non-Rich Communication Services (RCS) subscribers.

9. The method as claimed in claim 8, wherein, the method of provisioning RCS and non-RCS subscribers further comprising:

storing the authentication details of the non RCS network in the system;

storing the non RCS subscribers in the OMA CAB system using the "OMA-Converged Address Book XDM Specification";

adding the subscribers from non RCS networks as "presentities" in the SIP SIMPLE compliant entities using "OMA PRS-13 SIP SIMPLE interface";

subscribing to the presence notification events using the "OMA PRS-2 SIP SIMPLE interface"; and updating the iFC in IMS network using the ISC interface, to enable the system to be notified for the originating and ongoing sessions.

10. The method as claimed in claim 8, wherein, the process of subscribing to the non-RCS network in a non-federated set-up further comprising:

RCS user sending the subscription request to the IWG;

registering the IWG with non-RCS network and obtaining an application ID and requesting access to RCS subscriber's contact, presence and other relevant features to an authorization server at the respective non-RCS network provider;

returning the responses to a redirection endpoint which is a part of IWG by the authorization server containing RCS user specific access token;

storing the RCS user specific access token in a database by the IWG;

fetching the contacts of the non-RCS subscriber from respective non-RCS service provider using the RCS user specific access token; and provisioning for the access to the non-RCS subscriber details including presence information, contact information and other relevant features of non-RCS service.

11. The method as claimed in claim 8, wherein, the method of sending the presence status of the RCS subscriber to the non-RCS subscriber further comprising:

updating the presence status of the RCS subscriber by sending the SIP PUBLISH message;

routing the SIP PUBLISH message to a presence server in SIP SIMPLE architecture;

updating an interworking gateway by sending the SIP NOTIFY message as the IWG is subscribed to the presence notifications;

parsing the SIP URI and deciphering the non-RCS subscriber ID and the non-RCS service provider name from the SIP URI to determine the non RCS network; and sending an update to the relevant non-RCS provider by the IWG using an interface based on XMPP, SIP, REST based or any other proprietary mechanism as supported by the non-RCS provider thereby notifying the non-RCS subscriber about the presence status of RCS subscriber.

12. The method as claimed in claim 8, wherein, the method of sending the presence status of non-RCS subscriber to the RCS subscriber further comprising:

updating the presence status by the non-RCS subscriber;

sending notification of the update to the an interworking gateway using an interface between IWG and the non-RCS provider which is based on XMPP, SIP, REST based or any other proprietary mechanism as supported by the non-RCS provider;

generating SIP PUBLISH message on behalf of the non-RCS subscriber using IWG and further routing a SIP PUBLISH message through IMS/RCS core to a presence server located in the SIP SIMPLE network;

generating a SIP NOTIFY message to all the RCS users who would have subscribed to the presence updates of this particular non-RCS subscriber by the presence server; and delivering the SIP NOTIFY message to the RCS user thereby notifying the RCS subscriber about the presence status of non-RCS subscriber.

13. The method as claimed in claim 8 wherein the method of interworking between RCS and non-RCS subscribers in a conference or multi-party mode, further comprising:

interfacing with the standards based conferencing application server deployed in the RCS network provider's premise by IWG for signaling and media processing;

IWG acting in a multiplexed manner, as a single conference participant for every non RCS user who is a participant in the conference service for non-real time media based conferencing scenarios; and IWG participating only during the signaling phase for real time media based conferencing scenarios, by modifying the signaling parameters such that the media session is established directly between the non RCS user and the media mixer unit or the conference focus as may be the case depending on the actual conference solution deployed by the operator.

* * * * *